Nov. 7, 1939.    B. E. RONNING ET AL    2,179,301
VARIABLE SPEED TRANSMISSION MECHANISM
Filed Feb. 23, 1938    4 Sheets-Sheet 1

Inventors
Birdan E. Ronning
R. C. Mealey
By their Attorneys
Merchant & Merchant

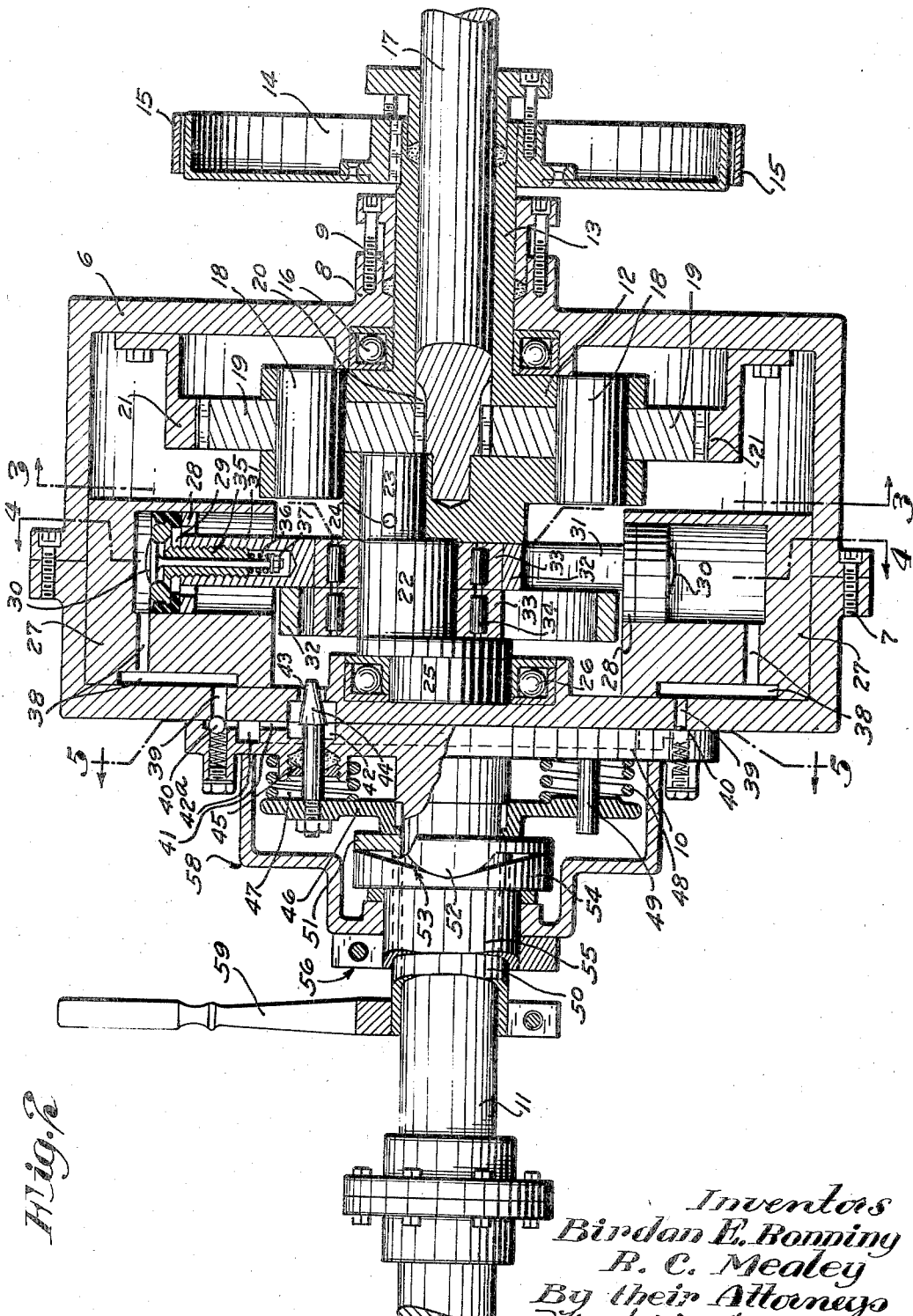

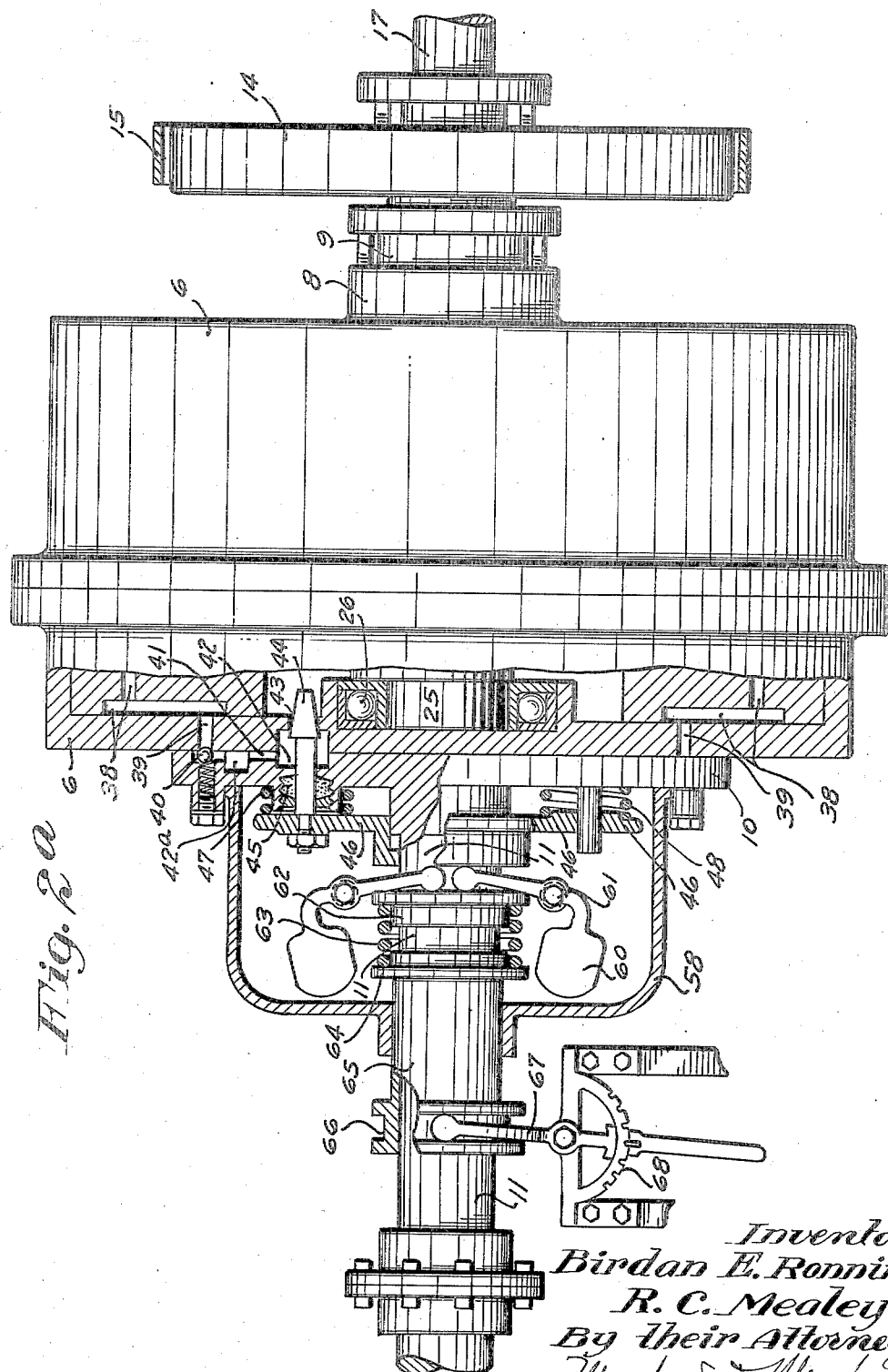

Nov. 7, 1939.  B. E. RONNING ET AL  2,179,301
VARIABLE SPEED TRANSMISSION MECHANISM
Filed Feb. 23, 1938  4 Sheets-Sheet 4

Inventors
Birdan E. Ronning
R. C. Mealey
By their Attorneys

Patented Nov. 7, 1939

2,179,301

UNITED STATES PATENT OFFICE 2,179,301

VARIABLE SPEED TRANSMISSION MECHANISM

Birdan E. Ronning and Robert C. Mealey, Minneapolis, Minn., assignors of one-third to Jacob A. Ronning, Minneapolis, Minn.

Application February 23, 1938, Serial No. 192,039

8 Claims. (Cl. 74—293)

Our invention relates to variable speed transmission mechanism and is in the nature of an improvement on or modification of the variable speed transmission mechanism disclosed and claimed in the application of Robert C. Mealey, Serial Number 137,604, filed April 19, 1937.

The present invention accomplishes, by a much simpler mechanism than that specifically disclosed in the earlier Mealey application, all of the major objects of the said earlier application, and involves novel features which give improved results. For instance, in the drawings of the earlier Mealey application, the variable speed forward and reverse drives are accomplished by the use of independent gear carriers and planetary gears independently connecting the same to an enclosing casing; whereas, in the present improved transmission the variable speed forward and reverse drives are accomplished by the use of a single gear carrier and planetary gear connection and the enclosing casing.

The present invention, in its most approved form, may be briefly outlined or described as follows: A casing adapted to contain oil is mounted for free rotation on suitable bearings. A driving shaft, that is journaled in respect to the casing, is extended into the casing and therein provided with a driving pinion. Rotatively mounted in the casing for rotation on an axis that is coincident with the axis of the driving shaft and the casing is a gear carrier. This gear carrier is provided on one side with a crank-acting eccentric and on its other side with a sleeve that extends outward of the casing and is adapted to be locked or retarded in its movement by a drum and brake band or the like.

The gear carrier carries one or more, preferably two, planetary gears that are mesh with the pinion of the driving shaft; and the casing is provided with an internal gear with which the outer portions of the planetary gear or gears therein mesh. The gear casing is internally provided with one or more pump cylinders, preferably four, quadrantly spaced with their axes radiating from the axis of rotation of the casing.

Working within the cylinders are pump-acting pistons that are reciprocated by the crank-acting eccentric of the gear carrier. Valves and conduits are arranged to cause a circulation of the oil from the casing through the cylinders and back into the casing, whereby, as will hereinafter appear, the pumps afforded by the cylinders and the pistons will variably act to transmit motion from the drive shaft to the casing and from the latter to a driven shaft or element from which the transmitted power will be taken off at variable speed.

In the accompanying drawings, which illustrate the commercial form of the device or mechanism, like characters indicate like parts throughout the several views.

Referring to the drawings:

Fig. 2 is a view chiefly in vertical section taken on the line 2—2 of Fig. 1;

Fig. 2a is a view corresponding in its major features of construction with Figs. 1 and 2, but differing therefrom in that it illustrates a centrifugal valve actuator or governor;

Figure 3:
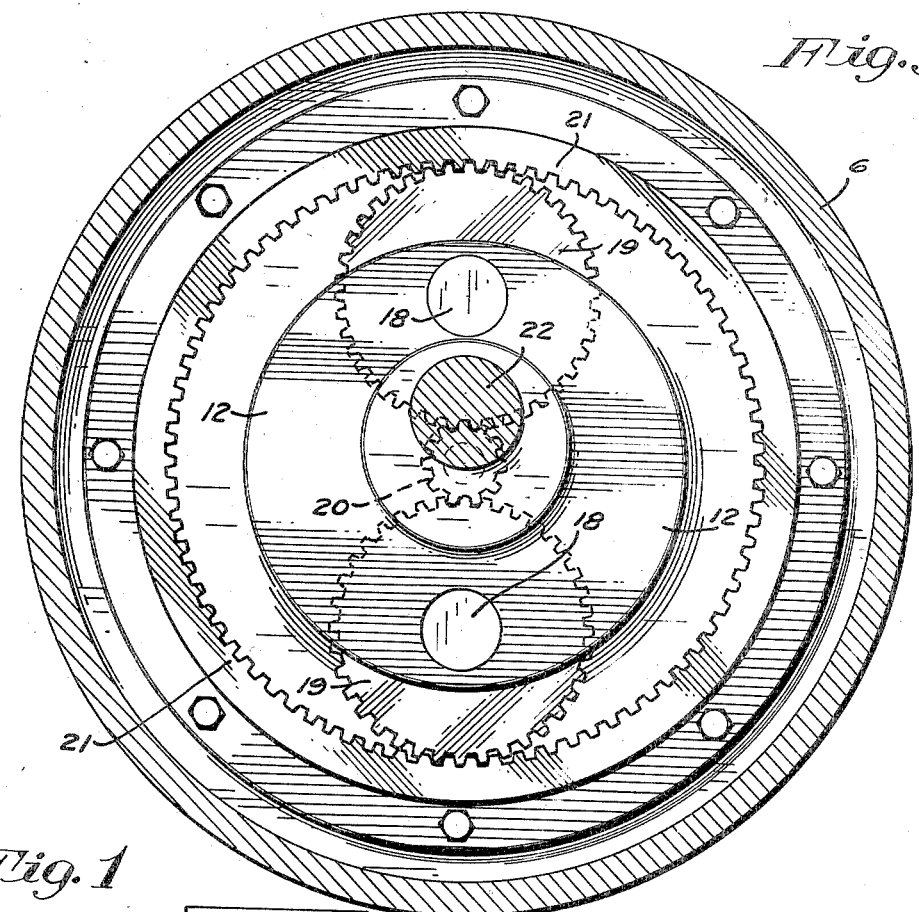
Fig. 3 is a section taken approximately on the irregular line 3—3 of Fig. 2.

The gear mechanism and co-operating movable parts of the mechanism are mounted in an oil-containing casing 6 which, as shown, is made in two parts rigidly but detachably connected by screws 7 or the like. One of the sections is provided with an axial hub 8, shown as equipped with a stuffing box 9; and the other section is provided with a rigidly secured port-equipped head plate 10. This head plate constitutes a rigid part of the rotary casing 6 and it is provided with a power take-off shaft 11 that projects axially of the casing.

Rotatively mounted within the casing 6 is a flanged gear carrier 12 that is provided with an axially projecting sleeve 13 that is extended outward through the hub 8 and stuffing box 9, and in this preferred arrangement is provided, at its outer end, with a brake drum 14 that is subject to a relatively fixed or non-rotary brake drum 15 of any well-known or suitable arrangement. An anti-friction ball bearing 16 is shown as interposed between the sleeve 13 and the hub 8.

A driving shaft 17 which, in practice, will receive power from any suitable source, is extended through and journalled in the sleeve 13, the extreme inner end thereof being shown as reduced and seated in the body of the gear carrier. The body of the gear carrier, as preferably designed, is made up of two laterally spaced disc-like portions rigidly tied together by short but heavy spindles 18 on which are journalled planetary spur gears 19. These gears 19, at their inner portions, mesh with a pinion or relatively small gear 20 carried by the driving shaft 17 and, as shown, milled into the body of the shaft. The outer portions of the planetary gears 19 mesh with a relatively large internal gear 21 that is located within but rigidly secured to the adjacent section of the casing 6.

The gear carrier 12 is provided with and carries a crank or eccentric 22 which, as shown, is of a somewhat peculiar arrangement in that it is provided, at one side, with a trunnion 23 that is extended into the adjacent plate of the gear carrier and is rigidly secured thereto by suitable means, such as a key or pin 24. At its opposite side the crank 22 has a trunnion 25, the axis of which is concentric to the common axis of the casing 6, of the gear carrier 12, of the driving shaft 17, and of the driven or power take-off shaft 11. By means of ball bearing devices or the like, indicated at 26, the trunnion 25 is journalled in a hub or flange formed on the adjacent wall of the left-hand section of the gear casing 6.

Rigidly secured to and located within the casing 6 are pump cylinders 27. These cylinders may vary in number but, as shown, are preferably four, located with their axes directly toward the common axis of the casing and various other rotary parts noted. These cylinders are arranged in diametrically aligned pairs, the one pair being in a plane slightly offset from the plane of the axes of the other two diametrically aligned cylinders. These cylinders, as shown, are independently formed and rigidly secured within the casing 6, but might be cast integral therewith. Circumferentially of the casing the cylinders are quadrantly spaced, that is, are progressively located 90° apart.

Working within each cylinder 27 is a piston head 28 provided with an intake port 29 that is equipped with a check valve 30 that freely opens under movement of the piston toward the open end of the cylinder but closes under reverse movement of the piston. The diametrically opposite pistons 28 are shown as rigidly connected to or formed as part of piston rods 31 which, at their central portions, are formed with transversely oblong eccentric straps or yokes 32. Eccentric 22 is as long as the two yokes 32 are wide and acts upon both of the said eccentric straps or yokes. However, to reduce friction, bearing rings 33 independently engage the respective yokes 32 and are independently mounted on the crank or eccentric 22 by anti-friction bearings, such as rollers 34.

It will now be noted that in this preferred arrangement illustrated the pistons 28 are provided with threaded stems 35 that are screwed into axial bores in the ends of the piston rods 31 and afford bearings through which the stems of the check valves 30 are passed. Also, as shown, the check valves 30 are normally yieldingly closed by light coiled springs 36 compressed between the ends of the stems 35 and nuts or heads 37 on the ends of the valve stems.

The inner ends of the cylinders 27 are connected by oil ports and conduits that are arranged to deliver oil from the cylinders back into the casing. These ports and conduits are so arranged that the flow of oil to and from the several cylinders may be regulated by a common or single valve. The said arrangement of ports, conduits and valves illustrated in the drawings, is as follows: From the outer end of each cylinder the oil conduit 38 leads to a port 39 in the left-hand wall of the casing 6. There is, therefore, a port 39 leading from each cylinder.

Figure 5:
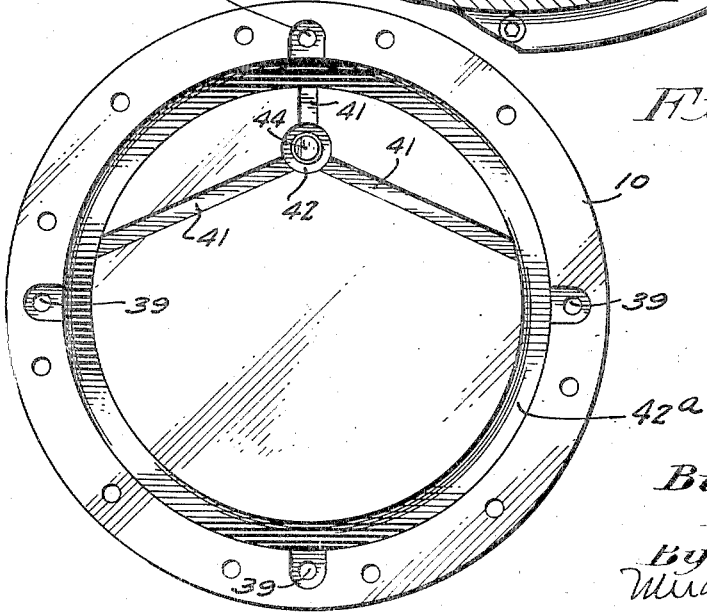
Fig. 5 is an elevation showing a port-equipped head plate of the rotary casing removed from the casing on the line 5—5 of Fig. 2.

Flow of oil from the cylinders through the respective ports 39 is freely permitted but reverse flow through the said ports 39 is checked or stopped, by spring-pressed check valves 40, shown as applied in the port or conduit equipped head plate 10. The several ports 39, however, are by conduits 41, 42, and 42a (see particularly Fig. 5, formed in the plate 10), connected to a common return port 43 formed in the adjacent wall of the casing 6.

The common return port 42 is arranged to be opened and closed by a suitable valve 44, the stem of which is extended through a stuffing box 45 in the plate 10 and is rigidly secured to a valve-actuating plate or member 46 that is mounted for sliding movements on the shaft 11 which latter, as previously stated, is rigidly secured to the plate 10, and hence, rotates with said plate and the casing 6. Plate 46 is outwardly spring-pressed by one or more, as shown two, coiled springs 47 and 48 compressed between the same and the plate 10. Spring 47 surrounds the hub of the stuffing box 45 while the spring 48 surrounds a pin 49 rigidly secured to the plate 10 and working through a closely fitting but loose perforation in the plate 46.

The numeral 50 indicates a sleeve that is mounted for oscillatory movements on the shaft 11 and is provided, at its inner end, with a collar 51 that engages the hub of the valve-actuating plate 46. Collar 51 is provided with a cam lug 52 that engages a cam surface 53 on the collar 54 of a sleeve 55 that surrounds the sleeve 50 and is rigidly anchored against both rotary and axial movements by a suitable fixed support, such as a cross-bar 56, see Figs. 1 and 2, of an automobile chassis 57.

Figure 1:
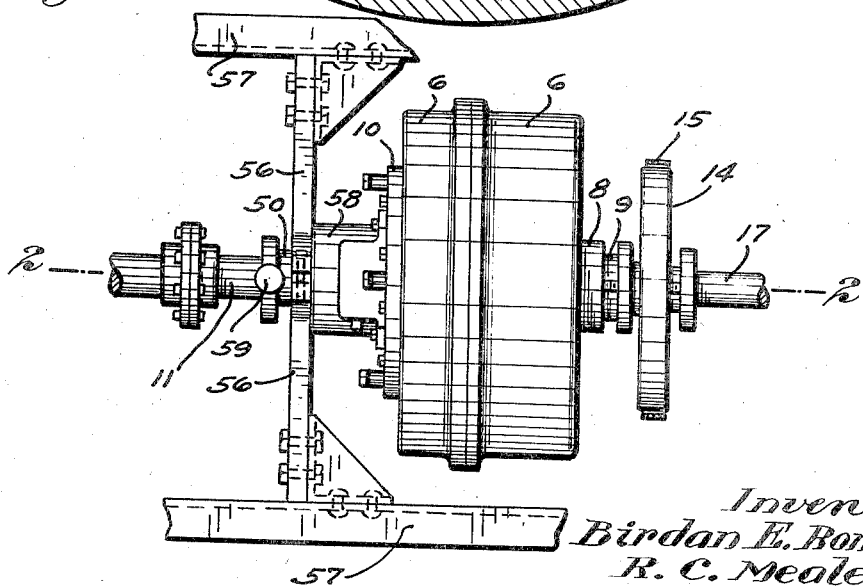
Fig. 1 is a plan view of the transmission mechanism showing the same installed in connection with a frame such the the frame of an automobile chassis, parts being broken away.
Figure 4:
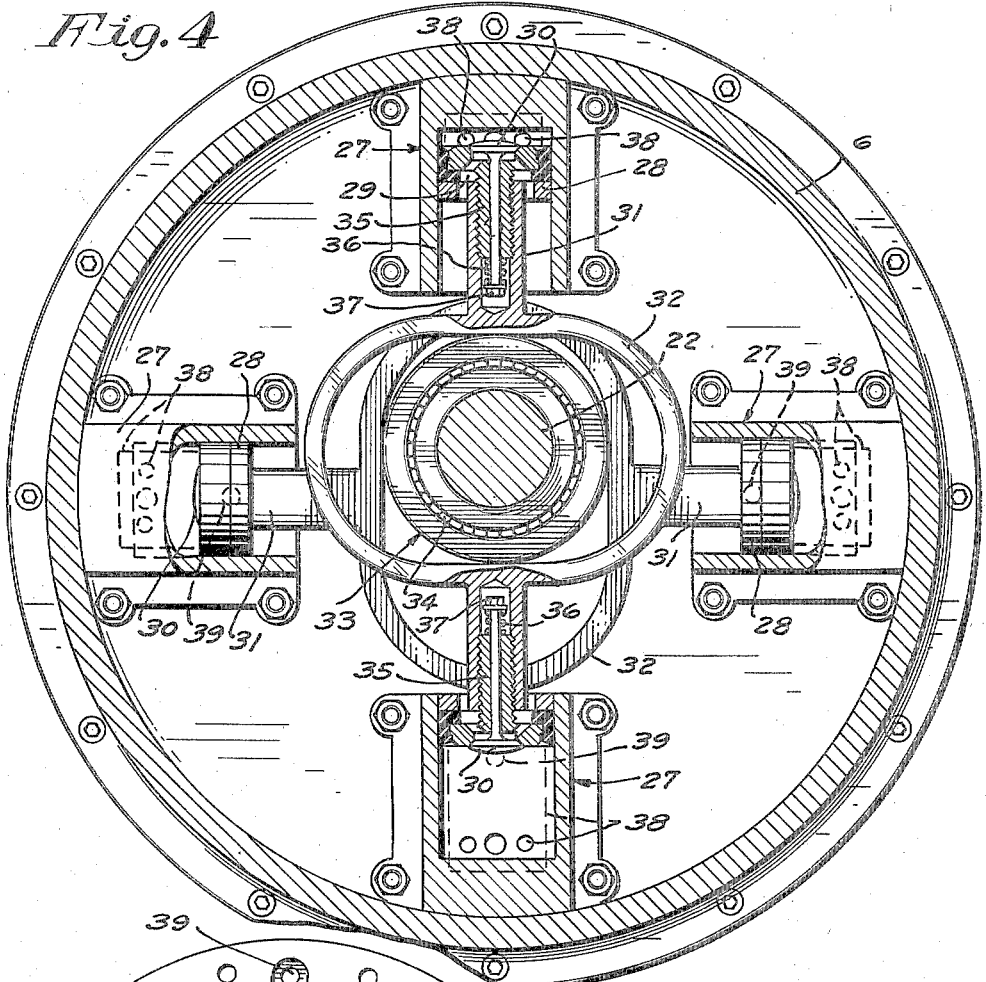
Fig. 4 is a section taken approximately on the line 4—4 of Fig. 2, some parts being broken away.

All of those parts just noted that are outward of the plate 10 and inward of the cross-bar or fixed support 56 are enclosed in the supplemental casing or shell 58 that is rigidly secured to the plate 10, and hence, rotates with the casing 6. The sleeve 50 is capable of both oscillatory and axial movements and at its outer end, see Figs. 1 and 2, is shown as provided with a lever 59, by means of which it may be oscillated. It may be restated that the casing 6, plate 10, and supplemental casing 58, are connected for rotation as an integral member. Any suitable supports for the rotary members described may be provided. For illustrative purposes the anchor, fixed sleeve 55, which supports the shaft 11, has been described as supported by the cross-bar 56. The outer portion of the driving shaft 17 may be supported in a like or any other suitable bearing, not shown.

In the mechanism so far described in detail, the controlling valve is arranged to be manually operated, to wit: by manipulation of lever or hand piece 59, but in the arrangement shown in Fig. 2a, the operation of the controlling valve is arranged to be manually set and thereafter automatically controlled by a centrifugal governor. In this modified structure of Fig. 2a, all of the mechanism described down to and including the valve-actuating plate 46, are just as previously described, but in this modified arrangement the automatic action is performed by a centrifugal governor which includes weighted levers 60 pivoted to supplemental casing 58 at 61, with their inner ends engaged against the hub of plate 46.

Slidably mounted on shaft 11 is a shipper collar 62 that engages the free ends of the weighted levers 60 and is subject to a coiled spring 63 that reacts against the relatively fixed collar 64 on said shaft 11. This collar 64, which serves as a base of reaction for spring 63, is preferably secured to a sleeve 65 that is slidably mounted on shaft 11 and has an annular groove 66 in its outer end that is engaged by an adjusting lever 67 pivoted to a fixed supporting segment 68 to which said lever is adapted to be locked in different positions to vary the tension of the spring 63. This spring 63 is much stronger than the springs 47 and 48, and hence, in its various adjustments, will overcome said last noted springs and tend to cause control valve 44 to close for common return port 43.

GENERAL OPERATION

*Forward drive*

The immediately following description of operation will refer particularly to the structure illustrated in Figs. 1, 2, 3, 4 and 5. The shaft 17 has been described as the driving shaft and will be so treated in the description of the operation, although power could be transmitted in the reverse order, that is, the shaft 11 could be the driving shaft; and will assume that the shaft 11 is power-driven in a clockwise direction in respect to Fig. 3. For what is designated as forward drive of an automobile or motor-propelled vehicle or for the primary direction of transmission of power in any other transmission mechanism, the brake band 15 should be loosened so that the gear carrier 12 is free for rotation; and the control valve 44 should be moved to the left in respect to Fig. 2 so as to give maximum opening of the common return port 43, and hence, the freest possible circulation of oil to and from the several cylinders and from and back to the gear casing.

When drive shaft 17 is rotated in a clockwise direction, as stated, the planetary gears 19 will be rotated in a counter-clockwise direction and if there were no resistance to circulation of the oil through the cylinders and conduits, then the planetary carrier would simply travel in a clockwise direction within the internal gear 21. However, even with the valve 44 in open position, there will be some resistance to the flow of the oil, and hence, the gear carrier 12 rotating in the clockwise direction and carrying the planetary gears 19 in the same direction, will cause the internal gear 21, and hence, the entire casing 6 and parts carried thereby, including the driven shaft 11, to rotate, first slowly, in a clockwise direction. Under such action the gear carrier, and hence the crank 22, which is secured thereto, will rotate in the same direction as the gear casing, but at a lower rate of speed, so that the crank will impart reciprocating motions to the pistons and reciprocating movements within the cylinders will draw oil from the casing or reservoir into the cylinders and will discharge the same through the conduits noted back into the casing through the common port 43. Rotation of the power take-off shaft 11 is thus started slowly, to increase the speed of rotation of the casing, and hence of the shaft 11, in respect to that of the power shaft 17, the control valve 44 will be moved toward the right in respect to Fig. 2 so as to gradually close the port 43 and thus increase the resistance to the travel of oil through the cylinders.

When valve 44 is moved so as to entirely close port 43 no oil can be circulated through the cylinders, and hence, the movement of the pistons when the cylinders are stopped and the planetary gears are locked against rotation so that the power shaft 17, the gear casing and the power take-off shaft 11 will be locked for common rotation. Otherwise stated, when the circulation of oil through the pump-acting cylinders and pistons is stopped, there will be a direct drive between the shaft 17 and shaft 11, and the shaft 11 will then be rotated at the same speed with the shaft 17. As is evident, the speed of shaft 11, in respect to shaft 17, may be gradually increased from the lowest possible speed of the latter, to the maximum speed of the power shaft, thus avoiding all jars or shocks in the transmission mechanism.

In the constructed and tested apparatus illustrated in the drawings of this application, the gear arrangement is such that the gear ratio between shaft 17 and 11 at maximum speed of the latter, will be approximately seven and one-quarter (7¼) revolutions of the driving shaft 17 in respect to the driven shaft 11. This relatively slow speed of shaft 11 is due to the arrangement of the gears 19, 20 and 21 and co-operating devices. In this arrangement also the speed of operation of the cylinder and piston pumps is reduced so that there will be a relatively small flow of oil from a large oil- containing receptacle or casing. This feature is important because the more rapid the flow of oil produced in the transmitting action the greater will be the heat produced and the heat, as is well-known, is a detrimental element in transmission mechanism.

*Reverse drive*

For reverse drive, that is, for rotation of the power take-off shaft 11 in a direction reverse to that of the power shaft 17, change in direction of the rotation of the power shaft is not required. Hence, said shaft 17 will still be assumed to be driven in a clockwise direction in respect to Fig. 3. For reverse drive the valve 44 should be moved to extreme position toward the left in respect to Fig. 2 so as to nearly or quite completely open port 43 and thereby give the freest possible circulation of the oil through the pump-acting cylinders and pistons; and the brake band or equivalent retarding means should be set more or less tightly on the drum 14 so as to either stop or retard rotation of the gear carrier 12. If the drum, and hence the gear carrier, should be locked positively against rotation, pinion 20 will then rotate planetary gears in a counter-clockwise direction and said planetary gears acting on the internal gear 21 will then positively rotate gear casing 6, and hence shaft 11, in a direction reverse to that of the driving shaft, to wit: in a counter-clockwise direction, but at a much slower rate of speed. However, by gradually setting the brake on the drum 14, the reverse drive, just stated, may be progressively applied so that there will be no intense shocks or strains on the gears.

Under the adjustments just described, the pistons will be caused to reciprocate in the cylinder and there will be some but no great resistance to the flow of oil.

If under reverse drive just described the brake on drum 14 should be tightly set and at the same time the control valve 44 be gradually closed, a brake setting action would be produced which would increase until the port 43 has been completely closed and further circulation of oil cut off and at which time all of the locating ports would be locked against movement. This stopping of rotation of the parts, while not desirable in most cases, could be utilized to the required extent, thereby making further brake setting action unnecessary.

If under the forward drive first described and while port 43 is open, the brake on drum 14 should be gradually set, that would produce a brake setting action by an action that would gradually convert the forward drive into reverse drive. Under both forward and reverse drive the mechanism described serves the purpose of an ordinary clutch, because the driving action in the one direction or the other may be gradually applied.

So far as the valve control above described is concerned, the action on the mechanism described is the same whether the valve actuating mechanism be that shown in Fig. 2a or in the other views. In the manually operated valve actuating device shown in Figs. 1, 2, 3, 4 and 5, the closing of valve 44 is produced by oscillation of lever 59 which causes movement of the cam lug 52 on relatively fixed cam surface 53 and which forces the valve to or toward its seat in the port 43.

For starting the rotation of shaft 11 with the valve control mechanism of Fig. 2a, sleeve 65, by manipulation of lever 67, will be retracted or moved toward the left so as to release the tension of spring 63 and thereby permit the springs 47 and 48 to retract control valve 44 and open port 43 to the maximum extent. Then to increase the speed of shaft 11 sleeve 65 is moved toward the right so as to cause the tension of spring 63 to overcome springs 47 and 48 and progressively move valve 44 to or toward a port closing position. Here, as in the earlier described operation, when port 43 has been completely closed, shaft 11 will be driven at the speed of shaft 17. In many applications of the transmission mechanism, and especially in stationary commercial installations, it may be desirable to drive shaft 11 at some definite speed less than that of the driving shaft 17 and this may be accomplished with the control mechanism shown in Fig. 2a.

Assume, for example, that driving shaft 17 is driven at a constant speed of 1000 revolutions per minute and that it is desired to set the mechanism to drive shaft 11 at 500 revolutions per minute. To accomplish this, the sleeve 65, after it has been moved toward the right, so as to speed up the shaft 11 to something more than 500 revolutions, can then, by manipulation of lever 67, be again retracted until the sleeve 65 has been set and the springs 63 tensioned so as to set the weighted levers so that they will, acting on plates 46, move valve 44 towards a port closing position, whenever the speed of shaft 11 falls below 500 revolutions; and will cause said valve 44 to move toward port opening position whenever the speed of shaft 11 exceeds or tends to exceed 500 revolutions per minute. The weighted levers 60 are, of course, carried by the rotary gear casing, and hence, there will be a variation in speed between the shaft 11 and the casing at all times, except when the port 43 is completely closed; but the adjustment of the weight of said levers and the tension of the controlling springs will be set so as to accomplish the above described speed control of the driven shaft.

What we claim is:

1. In a transmission mechanism, an oil-containing casing, a power shaft extending into said casing and therein provided with a driving pinion, a gear carrier within said casing rotatively mounted coincident with said driving shaft and the axis of said casing, an annular gear secured to and within said casing, a planetary gear journaled on said gear carrier and meshing with said driving pinion and internal gear, an eccentric connected to and rotatable with said gear carrier, a cylinder carried within said casing, a piston in said cylinder operative by rotation of said eccentric in respect to said casing, said cylinder and piston operating to circulate oil from and to said casing, means for varying the circulation of the oil, and means extended from said gear carrier to the exterior of said casing for stopping or retarding rotation of said carrier.

2. The structure defined in claim 1 in which there are a plurality of said cylinder and piston pumps combined with circulating conduits from said casing to said pumps and from said pumps back to said casing, said circulating connections including a common control port, and a common control valve for variably opening and closing said common port.

3. In a transmission mechanism, an oil-containing casing, a power shaft extending into said casing and therein provided with a driving pinion, a gear carrier within said casing rotatively mounted coincident with the driving shaft and axis of the casing, an annular gear secured to and within said casing, a planetary gear journaled to said gear carrier and meshing with said driving pinion and internal gear, an eccentric connected to and rotatable with said gear carrier, a cylinder within said casing, a piston in said cylinder operative by rotation of said eccentric in respect to said casing, a fluid conduit for delivering oil to and from said piston and to and from said casing, a valve for regulating the flow of fluid through said conduit, means for manually setting said valve for a predetermined flow of fluid, and a centrifugal governor operative on said valve for maintaining the manually set predetermined flow of fluid.

4. The structure defined in claim 1 in which the means for varying the stated circulation of oil includes a control valve, and in combination with means for manually setting said valve for predetermined flow, and a centrifugal governor adapted to be variably set to maintain the manually set predetermined flow.

5. The structure defined in claim 1 in which there are a plurality of said cylinder and piston pumps combined with circulating conduits from said casing to said pumps and from said pumps back to said casing, said circulating connections including a common control port, and a common control valve for variably opening and closing said common port, manual means for setting said control valve in different positions for variable flow of fluid and variable speed, and a manually set automatic centrifugal governor operative on said valve to maintain a predetermined manually set flow and resulting speed.

6. The structure defined in claim 1 in which said eccentric at one side has a trunnion rigidly seated in said gear carrier at a point eccentric to its axis of rotation, and at its other side is provided with a bearing hub that is journaled in one wall of said casing at the common axis of said casing and power shaft.

7. The structure defined in claim 1 in which there are a plurality of said cylinder and piston pumps combined with circulating conduits from said casing to said pumps and from said pumps back to said casing, said circulating connections including a common control port, and a common control valve for variably opening and closing said common port, and check valves in the several branch conduits leading from said several cylinders.

8. In a transmission mechanism, a rotary oil-containing casing, driving and driven shafts, one connected to rotate with said casing and the other extended thereinto and provided therein with a pinion, an internal gear secured to and within said casing, a gear carrier mounted to rotate within said casing on an axis concentric with the common axis of said casing and shafts, a planetary gear journaled on said gear carrier and meshing with said pinion and internal gear, and a variably yielding driving connection between said gear carrier and casing, said variably yielding driving connection includes a crank-acting eccentric on said gear carrier, a plurality of cylinder and piston pumps within and carried by said casing and subject to said crank-acting eccentrics, said pumps and casing having circulating conduits leading through a common control port, and a single valve for controlling said common port and hence the flow of fluid to and from said several pumps, and check valves in the several branch conduits leading from said several cylinders.

BIRDAN E. RONNING.
ROBERT C. MEALEY.